US006677550B2

(12) United States Patent
Förnsel et al.

(10) Patent No.: US 6,677,550 B2
(45) Date of Patent: Jan. 13, 2004

(54) PLASMA NOZZLE

(75) Inventors: Peter Förnsel, Spenge (DE); Christian Buske, Steinhagen (DE)

(73) Assignee: PlasmaTreat GmbH, Steinhagan (DE)

( * ) Notice: Subject to any disclaimer, the term of this patent is extended or adjusted under 35 U.S.C. 154(b) by 0 days.

(21) Appl. No.: 10/148,551

(22) PCT Filed: Dec. 11, 2000

(86) PCT No.: PCT/EP00/12501

§ 371 (c)(1), (2), (4) Date: Jun. 3, 2002

(87) PCT Pub. No.: WO01/43512

PCT Pub. Date: Jun. 14, 2001

(65) Prior Publication Data

US 2002/0179575 A1 Dec. 5, 2002

(30) Foreign Application Priority Data

Dec. 9, 1999 (DE) .................................... 299 21 694 U

(51) Int. Cl.[7] .................................................. B23K 9/02
(52) U.S. Cl. .................................................. 219/121.5
(58) Field of Search ......................... 219/121.47, 121.5, 219/121.36, 121.48, 121.59; 315/111.31, 111.21, 231.3

(56) References Cited

U.S. PATENT DOCUMENTS

| | | | | |
|---|---|---|---|---|
| 5,628,924 A | | 5/1997 | Yoshimitsu et al. | |
| 5,679,167 A | * | 10/1997 | Muehlberger | 219/121.47 |
| 5,837,958 A | * | 11/1998 | Fornsel | 219/121.5 |
| 6,197,026 B1 | * | 3/2001 | Farin et al. | 219/121.5 |
| 6,227,846 B1 | * | 5/2001 | Zagoroff | 431/345 |

FOREIGN PATENT DOCUMENTS

| | | |
|---|---|---|
| DE | 2642649 | 3/1978 |
| DE | 19532412 | 9/1999 |
| GB | 969831 | 9/1964 |

* cited by examiner

*Primary Examiner*—Mark Paschall
(74) *Attorney, Agent, or Firm*—Richard M. Goldberg

(57) ABSTRACT

A plasma nozzle for treating surfaces, especially for the pre-treatment of plastic surfaces, with a tubular, electrically conductive housing (10), which forms a nozzle channel (12), through which the working gas is flowing, an electrode (18), disposed coaxially in the nozzle channel, and a high-frequency generator (20) for applying a voltage between the electrode (18) and the housing, the outlet of the nozzle channel (12) is constructed as a narrow slot (32), which extends transversely to the longitudinal axis of the nozzle channel.

20 Claims, 2 Drawing Sheets

PLASMA NOZZLE

BACKGROUND OF THE INVENTION

The invention relates to a plasma nozzle for the treatment of surfaces, especially for the pre-treatment of plastic surfaces, with a tubular, electrically conductive housing, which forms a nozzle channel, through which the working gas is flowing, and with a high-frequency generator for applying a voltage between the electrode and the housing.

A plasma nozzle of this type is described in the DE 195 32 412 A1 and is used, for example, for the pretreatment of plastic surfaces, so that the application of adhesives, printing inks and the like on the plastic surface becomes possible or is facilitated. Such a pretreatment is necessary, since, in the normal state, plastic surfaces cannot be wetted with liquids and therefore do not accept the printing ink or the adhesive. The surface structure of the plastic is changed by the treatment, so that the surface can be wetted by liquids with a relatively high surface tension. The surface tension of the liquids with which the surface can still be wetted, represents a measure of the quality of the pretreatment.

By means of the known plasma nozzle, a relatively cool, yet highly reactive plasma jet is achieved, which has the approximate configuration and dimensions of the flame of a candle and therefore also permits the pretreatment of profiled parts with a relatively deep relief Because of the high reactivity of the plasma jet, a very brief pretreatment is sufficient, so that the workpiece can be passed by the plasma jet at a correspondingly high speed. Because of the relatively low temperature of the plasma jet, the pretreatment of heat-sensitive plastics is also possible. Since a counter-electrode is not required on the back of the workpiece, surfaces of block-like workpieces of any thickness, hollow bodies and the like can be pretreated without any problems. For a uniform treatment of larger surfaces, a battery of several plasma nozzles, disposed offset, has been proposed in the aforementioned publication. In this case, however, a relatively large expenditure for equipment is required.

SUMMARY OF THE INVENTION

It is therefore an object of the invention to create a plasma nozzle which, in spite of its very compact construction, enables large surfaces of a workpiece to be treated.

This object it is accomplished in the case of a plasma nozzle of the type named above owing to the fact that the outlet of the nozzle channel is constructed as a narrow slot extending transversely to the longitudinal axis of the nozzle channel.

Surprisingly, it has turned out that, by using such an outlet slot, the geometry of the plasma jet can be changed effectively. The plasma jet no longer is in the shape of the flame of a candle and, instead, experiences an extreme expansion within the slot, so that a two-dimensional, yet nevertheless uniform plasma treatment of the workpiece surface becomes possible. If an extended workpiece surface is in front of the opening of the plasma nozzle, the plasma flows to the outside at the diverging edges of the fan and a reduced pressure is developed in the interior of the fan with the result, that the fan-shaped plasma jet is literally “drawn in” to the workpiece, so that the surface of the workpiece comes into intimate contact with the reactive plasma and, accordingly, a very effective surface treatment is achieved.

As in the case of the conventional plasma nozzle, the working gas can be twisted in the nozzle channel. The twisted plasma jet can also be expanded fan-fashion with the help of the outlet slot. At most, the twisting leads to a slight S-shaped distortion of the fan, when looking frontally at the opening of the plasma nozzle.

The intensity distribution of the plasma over the length of the slot can be controlled, for example, owing to the fact that the width of the slot varies over the length. In a preferred embodiment, however, a transverse channel, extending parallel to this slot and having a larger cross-section, in which the plasma can be distributed before it enters the actual outlet slot, is disposed directly upstream of the transverse slot. This arrangement can be produced particularly easily, if the outlet of the nozzle channel, including the slot and the transverse channel, is formed by a separate mouthpiece from an insulating material (ceramic) or preferably from metal, which is pressed or screwed into the housing.

Preferably, the transverse channel is open at either end and these open ends are surrounded only with a certain clearance by the walls of the housing, so that a portion of the plasma can emerge at the ends of the transverse channel and then be deflected by the walls of the housing obliquely in the direction of the workpiece. The plasma fan is then bounded at either edge by particularly intensive edge jets, which literally pull the fan apart. By these means, the shape of the fan and the intensity distribution of the plasma jet within the fan can be adjusted, for example, so that the downstream edge of the plasma fan assumes a concave shape, so that the fan simulates a dovetail. This is particularly advantageous for the pretreatment of convexly curved workpieces, such as cylindrical workpieces, but also proves to be of advantage for the pretreatment of flat workpieces, because the larger distance, which the plasma must cover in the edge regions of the fan before reaching the workpiece, is compensated for by a correspondingly greater intensity of the plasma jet. The contour of the face can be varied by varying the depth, at which the open ends of the transverse channel are retracted in the housing of the plasma nozzle, so that, for example and if necessary, a convex curvature of the downstream edge of the fan can also be reached.

In order to bundle the fan more in the direction perpendicular to the plane of the fan, auxiliary air can be supplied at the outer casing of the housing of the plasma nozzle on both sides of the plane of the fan. In this case, it may be appropriate if the outer surface of the housing of the plasma nozzle is constructed prism-shaped in the opening region and not conically, so that two flat surfaces are formed, which converge towards the plane of the fan.

BRIEF DESCRIPTION OF THE DRAWINGS

In the following, examples of the invention are shown in greater detail by means of the drawing, in which.

DETAILED DESCRIPTION

Figure 1:
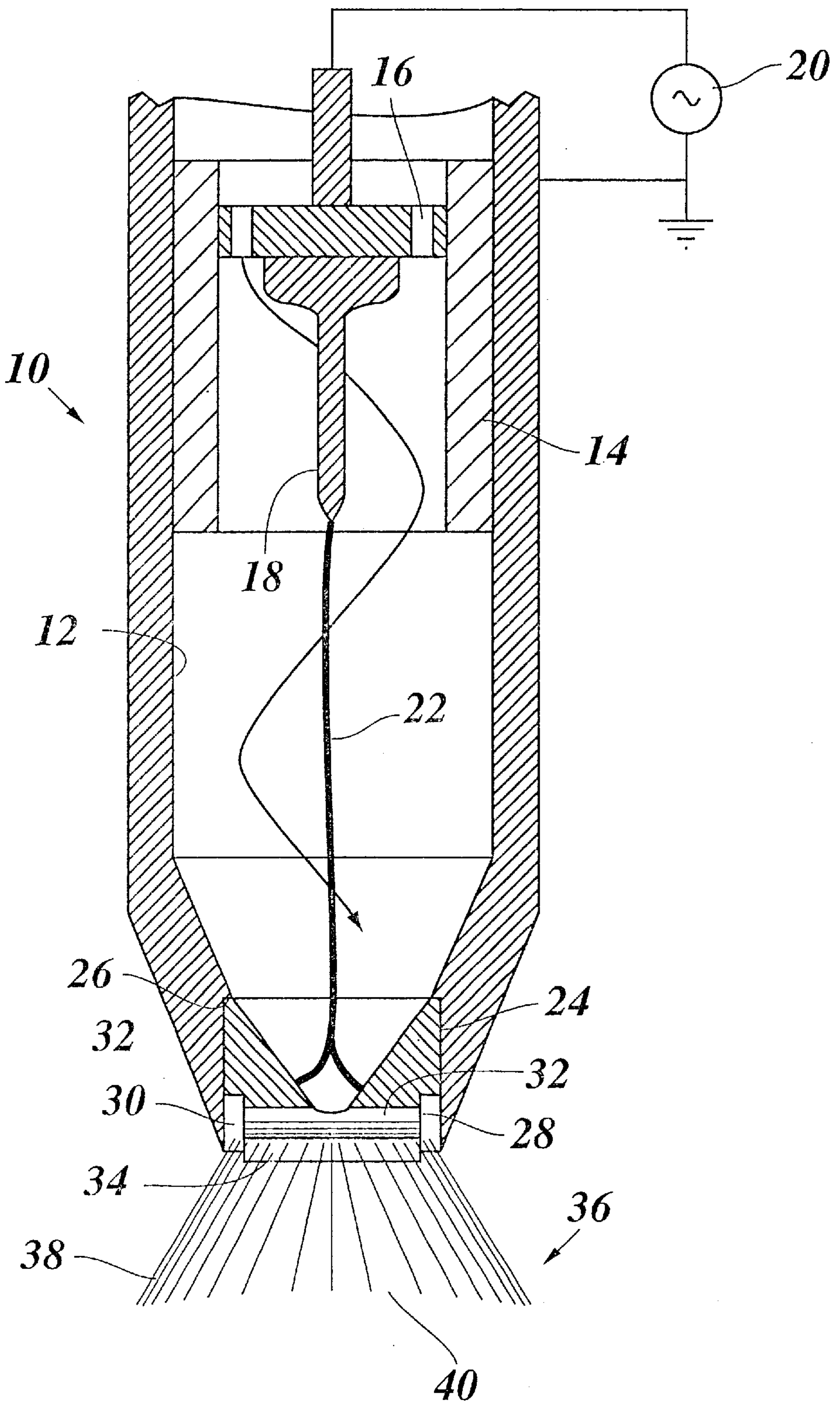
FIG. 1 shows an axial section through the plasma nozzle.

The plasma nozzle, shown in the drawing, has a tubular housing 10, which forms an extended nozzle channel 12, which is tapered conically at the lower end. An electrically insulating ceramic tube 14 is inserted into the nozzle channel 12. A working gas, such as air, is supplied to the nozzle channel 12 from the end, which is the upper end in the drawing and is twisted with the help of a twisting device 16, which is inserted into the ceramic tube 14 so that it flows in swirling fashion through the nozzle channel 12, as indicated by a helical arrow in the drawing. A swirling core, which extends along the axis of the housing, is thus formed in the nozzle channel 12.

A pin-shaped electrode 18, which protrudes coaxially into the nozzle channel 12 and at which a high-voltage is applied with the help of a high-voltage generator 20, is mounted at the twisting device 16. The voltage, generated with the help of the high-frequency generator 20, is of the order of a few kilovolts and has a frequency, for example, of the order of 20 kHz.

The housing 10, which consists of metal, is grounded and serves as a counterelectrode, so that an electric discharge can be produced between the electrode 18 and the housing 10. When the voltage is switched on, the high frequency of the alternating voltage and the dielectricity of the ceramic tube 14 initially cause a corona discharge at the twisting device 16 and the electrode 18. Due to this corona discharge, an arc discharge from the electrode 18 to the housing 10 is ignited. The arc 22 of this discharge is carried along by the twisted working gas flowing in and channeled in the core of the swirling gas flow, so that the arc then extends almost linearly from the tip of the electrode 18 along the axis of the housing and branches radially to the wall of the housing only in the region of the opening of the housing 10.

In the mouth of the housing 10, a cylindrical mouthpiece 24 of copper is inserted, the axial, the inner end of which lies against a shoulder 26 of the housing. The conically tapered end of the nozzle channel 12 is continued in the mouthpiece 24 continuously at the same or at a slightly altered conical angle. The arc 22 branches within the mouthpiece 24 to the conical wall of the mouthpiece.

Figure 2:
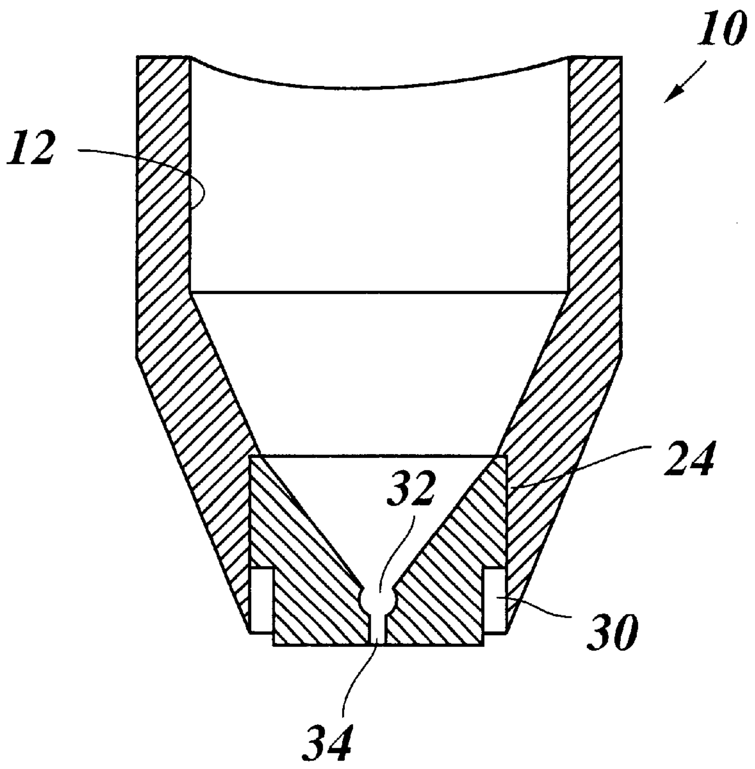
FIG. 2 shows an axial section through the plasma nozzle in a direction perpendicular to the sectional plane of FIG. 1

At its free end, which is the lower end in FIG. 1, the mouthpiece 24 has a section 28 of reduced diameter which, together with the peripheral wall of the housing 10, forms an annular channel 30, which is open in the direction of the opening. The conically tapered end of the nozzle channel 12 discharges into a transverse channel 32, which is formed by a transverse borehole in the section 28 and is open at both ends to the annular channel 30. A narrower slot 34, which passes diametrically through the mouthpiece and is open to the end surface of the mouthpiece, adjoins this transverse channel 32, which has a circular cross section according to FIG. 2.

The working gas, flowing in twisting fashion through the nozzle channel 12, comes into intimate contact in the swirling core with the arc 22, so that a highly reactive plasma with a relatively low temperature is produced. This plasma is distributed in the transverse channel 32 and then emerges from the plasma nozzle partly through the slot 34 and partly also through the open ends of the transverse channel 32 and the annular channel 30. In this way, a plasma jet 36 in the form of a flat fan is produced, the density and flow velocity of which is greater in the edge regions 38 than in the vicinity of the nozzle axis. Accordingly, the reach of the plasma jet 36 is greater at the edges than in the center, so that the downstream edge 40 of the plasma jet has a concave curvature and the fan overall assumes the shape of a dovetail. This shape of the plasma jet ensures that the plasma jet nestles well against the workpiece, which is not shown.

Figure 3:
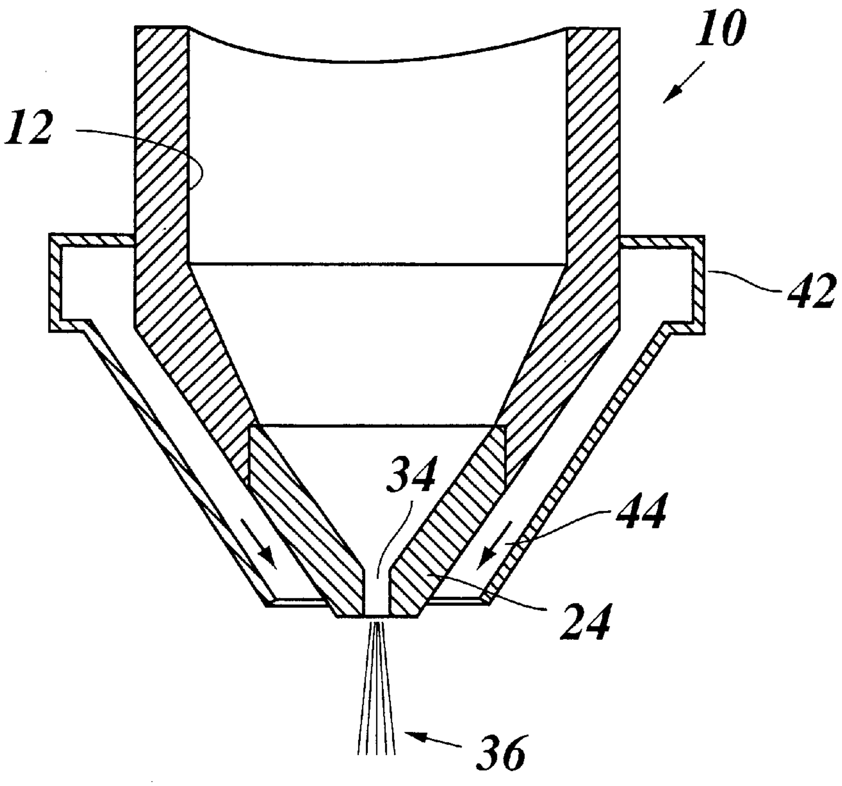
FIG. 3 shows a section similar to that of FIG. 2, for a different embodiment.

FIG. 3 shows a modified embodiment, in which the annular channel and the transverse channel are not present and the mouthpiece is bounded at the free end on both sides of the slot 34 by inclined surfaces, which are flush with corresponding inclined surfaces of the housing 10. The housing 10 is surrounded here by an air distributor 42, through which auxiliary air 44 is blown parallel to the inclined surfaces of the housing and of the mouthpiece 24 from both sides onto the plasma jet 36, emerging from the slot 34, in order to bundle the fan-shaped plasma jet and prevent premature expansion of this plasma jet in the direction perpendicular to the plane of the fan. At the same time, intimate contact of the plasma jet with the surface of the workpiece is supported by the auxiliary air.

What is claimed is:

1. A plasma nozzle for generating a jet of an atmospheric plasma for the treatment of surfaces, comprising:

a tubular, electrically conductive housing which forms a nozzle channel through which a working gas flows, said nozzle channel having a longitudinal axis and an outlet formed at one end of said tubular housing, an electrode disposed coaxially in the nozzle channel, and a high-frequency generator for applying a voltage between the electrode and the housing, wherein said outlet is constructed as a narrow slot which extends transversely to the longitudinal axis of the nozzle channel.

2. The plasma nozzle of claim 1, wherein the housing includes a twisting device which twists the working gas in the nozzle channel.

3. The plasma nozzle of claim 1, wherein the nozzle channel discharges into a transverse channel, which extends parallel to the slot and is, in turn, connected with the slot.

4. The plasma nozzle of claim 3, wherein the nozzle channel tapers conically at the outlet and is connected only in a central region of the transverse channel with this transverse channel.

5. The plasma nozzle of claim 3, wherein the transverse channel is open at opposite ends thereof.

6. The plasma nozzle of claim 5, wherein inner walls of the housing at an outlet end of the plasma nozzle are at a distance from the open ends of the transverse channel and deflect the plasma, emerging from these ends, towards a side of the slot.

7. The plasma nozzle of claim 6, wherein the ends of the transverse channel discharge into an annular channel, which is bounded by the housing and is open towards the same side as the slot.

8. The plasma nozzle of claim 1, wherein the slot and the outlet of the nozzle channel are formed in a mouthpiece, which is inserted into an open end of the housing.

9. The plasma nozzle of claim 8, wherein the mouthpiece is made of metal.

10. The plasma nozzle of claim 1, further comprising an air distributor which directs auxiliary air in a converging manner in a direction at right angles to a plane of the slot onto the plasma jet emerging from the slot, is mounted outside of the housing.

11. The plasma nozzle of claim 2, wherein the nozzle channel discharges into a transverse channel, which extends parallel to the slot and is, in turn, connected with the slot.

12. The plasma nozzle of claim 4, wherein the transverse channel is open at opposite ends thereof.

13. The plasma nozzle of claim 2, wherein the slot and the outlet of the nozzle channel are formed in a mouthpiece, which is inserted into an open end of the housing.

14. The plasma nozzle of claim 3, wherein the slot and the outlet of the nozzle channel are formed in a mouthpiece, which is inserted into an open end of the housing.

15. The plasma nozzle of claim 4, wherein the slot and the outlet of the nozzle channel are formed in a mouthpiece, which is inserted into an open end of the housing.

16. The plasma nozzle of claim 2, further comprising an air distributor which directs auxiliary air in a converging manner in a direction at right angles to a plane of the slot onto the plasma jet emerging from the slot, is mounted outside of the housing.

17. The plasma nozzle of claim 3, further comprising an air distributor which directs auxiliary air in a converging manner in a direction at right angles to a plane of the slot onto the plasma jet emerging from the slot, is mounted outside of the housing.

18. The plasma nozzle of claim 4, further comprising an air distributor which directs auxiliary air in a converging manner in a direction at right angles to a plane of the slot onto the plasma jet emerging from the slot, is mounted outside of the housing.

19. The plasma nozzle of claim 5, further comprising an air distributor which directs auxiliary air in a converging manner in a direction at right angles to a plane of the slot onto the plasma jet emerging from the slot, is mounted outside of the housing.

20. The plasma nozzle of claim 6, further comprising an air distributor which directs auxiliary air in a converging manner in a direction at right angles to a plane of the slot onto the plasma jet emerging from the slot, is mounted outside of the housing.

* * * * *